(12) United States Patent
Kim et al.

(10) Patent No.: US 10,281,795 B2
(45) Date of Patent: May 7, 2019

(54) LIQUID CRYSTAL LENS FILM STRUCTURE, METHOD OF FABRICATING THE SAME AND IMAGE DISPLAY DEVICE WITH THE SAME

(71) Applicant: LG DISPLAY CO., LTD., Seoul (KR)

(72) Inventors: Seong-il Kim, Uijeongbu-si (KR); Su Seok Choi, Seongnam-si (KR); Jong Hoon Woo, Goyang-si (KR); Joong Ha Lee, Paju-si (KR); Sang Hoon Oh, Jeollabuk-do (KR)

(73) Assignee: LG DISPLAY CO., LTD., Seoul (KR)

( * ) Notice: Subject to any disclaimer, the term of this patent is extended or adjusted under 35 U.S.C. 154(b) by 383 days.

(21) Appl. No.: 14/980,967

(22) Filed: Dec. 28, 2015

(65) Prior Publication Data
US 2016/0187760 A1    Jun. 30, 2016

(30) Foreign Application Priority Data

Dec. 29, 2014  (KR) .................. 10-2014-0192352
Dec. 11, 2015  (KR) .................. 10-2015-0176890

(51) Int. Cl.
*G02F 1/1337*  (2006.01)
*G02F 1/29*    (2006.01)
*G02F 1/1341*  (2006.01)

(52) U.S. Cl.
CPC .............. *G02F 1/29* (2013.01); *G02F 1/1337* (2013.01); *G02F 1/1341* (2013.01); *G02F 2001/294* (2013.01); *G02F 2202/28* (2013.01)

(58) Field of Classification Search
CPC . G02B 27/22; G02B 27/2278; G02B 27/2214
See application file for complete search history.

(56) References Cited

U.S. PATENT DOCUMENTS

| | | | |
|---|---|---|---|
| 2005/0128582 A1* | 6/2005 | Gibilini ............... | G03B 21/625 359/455 |
| 2009/0033812 A1* | 2/2009 | Ijzerman ............ | G02B 27/2214 349/15 |
| 2009/0087629 A1* | 4/2009 | Everaerts ................ | B32B 7/12 428/203 |
| 2010/0195203 A1 | 8/2010 | Zuidema et al. | |
| 2013/0003011 A1 | 1/2013 | Tsai et al. | |
| 2015/0077670 A1* | 3/2015 | Son ..................... | G02B 27/2214 349/33 |

(Continued)

FOREIGN PATENT DOCUMENTS

| CN | 101258427 A | 9/2008 |
|---|---|---|
| CN | 102323694 A | 1/2012 |

(Continued)

*Primary Examiner* — Phu Vu
(74) *Attorney, Agent, or Firm* — Birch, Stewart, Kolasch & Birch, LLP

(57) ABSTRACT

A liquid crystal lens film structure can includes a first substrate; a second substrate opposite to the first substrate; an adhesive layer on the second substrate; and a liquid crystal lens film between the first substrate and the adhesive layer. The liquid crystal lens film includes a resin layer configured to include a plurality of concave portions and a plurality of liquid crystal portions configured to each include liquid crystal molecules filled in the respective concave portion. The adhesive layer comes in contact with the liquid crystal lens film.

15 Claims, 16 Drawing Sheets

(56) References Cited

U.S. PATENT DOCUMENTS

| | | | | |
|---|---|---|---|---|
| 2015/0160467 A1* | 6/2015 | Kim | ................ | G02B 27/26 |
| | | | | 349/15 |
| 2015/0185487 A1* | 7/2015 | Lee | ................ | G02F 1/1336 |
| | | | | 349/15 |
| 2016/0187760 A1* | 6/2016 | Kim | ................ | G02F 1/29 |
| | | | | 349/139 |

FOREIGN PATENT DOCUMENTS

| CN | 102707539 A | 10/2012 |
|---|---|---|
| CN | 103513465 A | 1/2014 |
| CN | 103998957 A | 8/2014 |

\* cited by examiner

LIQUID CRYSTAL LENS FILM STRUCTURE, METHOD OF FABRICATING THE SAME AND IMAGE DISPLAY DEVICE WITH THE SAME

CROSS REFERENCE TO RELATED APPLICATION

This application claims the priority benefit of Korean Patent Application No. 10-2014-0192352 filed on Dec. 29, 2014 and Korean Patent Application No. 10-2015-0176890 filed on Dec. 11, 2015, which are hereby incorporated by reference in their entirety into this application.

BACKGROUND OF THE INVENTION

Field of the Disclosure

The present application relates to a liquid crystal lens film structure, a method of fabricating the same and an image display device including the same. More particularly, the present application relates to a liquid crystal lens film structure with an enhanced adhesive property and an enhanced liquid crystal alignment property, a method of fabricating the same and an image display device including the same.

Description of the Related Art

Stereoscopic three-dimensional (3-D) image display devices each provide different images to the right and left eyes of a user and enable the user to feel a sense of distance and a three-dimensional visual effect from a displayed image. Such stereoscopic 3-D image display devices are classified into glasses and glasses-free types according to whether or not a user wears glasses.

The glasses-type stereoscopic 3-D image display device causes users viewing a 3-D image to each wear glasses. Due to this, the glasses-free stereoscopic 3-D image display device is being recently preferred rather than the glasses-type stereoscopic 3-D image display device.

The glasses-free stereoscopic 3-D image display device can be broadly distinguished into a mode using a parallax barrier and another mode using a liquid crystal lens array. The glasses-type stereoscopic 3-D image display device using the parallax barrier had been actively researched. However, when a 3-D image is displayed, the glasses-type stereoscopic 3-D image display device using the parallax barrier deteriorates the definition of a displayed image by half and increases viewing points of the displayed image. As such, the glasses-type stereoscopic 3-D image display device using the parallax barrier largely deteriorates its definition and brightness. In view of this point, a need exists to develop the glasses-free stereoscopic 3-D image display device which employs the liquid crystal lens array.

The liquid crystal lens array of the related art used in the glasses-free stereoscopic 3-D image display device mainly employs glass substrates as upper and lower substrates. However, the glass substrate must have a large weight and thickness. Due to this, the liquid crystal lens array cannot become lighter and thinner. Also, the liquid crystal lens array increases the fabrication cost unlike that using a low-cost film material.

To address this matter, a liquid crystal lens array using flexible substrates instead of the glass substrates is developed. Such a structure of the liquid crystal lens array used in a glasses-free stereoscopic 3-D image display device according to the related art is shown in FIG. 1.

As shown in FIG. 1, the liquid crystal lens array includes a first flexible substrate and a second flexible substrate disposed to face each other. First and second transparent electrode layers are formed on opposite (or inner) surfaces of the first and second flexible substrates. Also, the liquid crystal lens array includes a liquid crystal lens film interposed between the first flexible substrate and the second flexible substrate. Moreover, the liquid crystal lens array includes an adhesive layer interposed between the second flexible substrate and the liquid crystal lens film, and a PI (polyimide) alignment film configured to align liquid crystal molecules of the liquid crystal lens film.

The liquid crystal lens film includes a lens portion with a lenticular lens shape and a non-lens portion. The liquid crystal molecules are aligned in a fixed direction by the PI alignment film, and realigned in another fixed direction when a voltage is applied between the first and second transparent electrode layers. The refractive index of the lens portion is varied along the change of the alignment direction of the liquid crystal molecules. As such, a progressive direction of light projected from the display device is changed by the lens portion.

FIG. 2 is a cross-sectional view schematically illustrating a method of displaying two-dimensional (2-D) and 3-D images by the glasses-free stereoscopic 3-D image display device which uses the related art liquid crystal lens array. Referring to FIG. 2, when any electric field is not applied to the liquid crystal lens film, the lens portion has the same refractive index as an ordinary refractive index of the liquid crystal and the non-lens portion has the same refractive index as an extra-ordinary refractive index of the liquid crystal. In other words, the lens portion and the non-lens portion have the different refractive indexes. As such, light passing through the liquid crystal lens film is refracted in an interface between the lens portion and the non-lens portion and generates a parallax. In accordance therewith, a 3-D image can be realized. On the other hand, when an electric field is applied to the liquid crystal lens film, the lens portion has the same refractive index as the ordinary refractive index of the liquid crystal. Then, any refractive index difference is not generated between the lens portion and the non-lens portion. As such, light passes through the liquid crystal lens film without any refraction. In accordance therewith, the 2-D image can be realized (or displayed). In this manner, the glasses-free stereoscopic 3-D image display device can selectively display the 2-D image and the 3-D image using the liquid crystal lens array.

As currently known, an adhesive strength between films of the liquid crystal lens array is weak and several defects must be generated. Actually, the films of the liquid crystal lens array are easily to peel off, and a liquid crystal material is easy to spread by a pressure which is applied at a combination of a display panel and the liquid crystal lens array.

Also, when the liquid crystal lens array includes flexible substrates such as film substrates, it is difficult to perform a high temperature process due to a low transition temperature Tg of the film substrate. Actually, a curl defect is generated in the film substrate at a high temperature polyimide process which is performed for aligning liquid crystal molecules. Due to this, the liquid crystal cannot have a desired refractive index when an electric field is applied. FIGS. 3, 4A, 4B, 5A and 5B are photographs illustrating problems generated in the structure of the related art liquid crystal lens array which includes the flexible substrates.

Moreover, an adhesive material of the adhesive layer within the related art liquid crystal lens array reduces an aligning force which is used to align the liquid crystal molecules. Due to this, an image quality property deteriorates. Furthermore, because the adhesive layer with a non-conductive property is formed on the second flexible substrate, a driving voltage necessary to apply an electric field to the liquid crystal material becomes higher. Therefore, some solutions to address these problems associated with the related art are desired.

BRIEF SUMMARY OF THE INVENTION

Accordingly, embodiments of the present application are directed to a liquid crystal lens film structure, a method of fabricating the same and an image display device with the same that substantially obviate one or more of problems due to the limitations and disadvantages of the related art.

The embodiments are to provide a liquid crystal lens film structure, which has an adhesive property and a liquid crystal alignment property, a method of fabricating the same and an image display device with the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the embodiments, a liquid crystal lens film structure includes: a first substrate; a second substrate opposite to the first substrate; an adhesive layer on the second substrate; and a liquid crystal lens film between the first substrate and the adhesive layer. The liquid crystal lens film includes a resin layer configured to include a plurality of concave portions and a plurality of liquid crystal portion configured to each include liquid crystal molecules filled in the respective concave portion. Also, the liquid crystal lens film comes in contact with the adhesive layer.

Boundaries between the concave portions are in contact with the adhesive layer. The adhesive layer includes adhesive capsules. The adhesive capsules are scattered in the adhesive layer.

A liquid crystal lens film structure according to another general aspect of the embodiments includes: a first substrate; a second substrate opposite to the first substrate; an adhesive layer on a surface of the first substrate opposite to the second substrate; and a liquid crystal lens film between the adhesive layer and the second substrate. The liquid crystal lens film includes a resin layer configured to include a plurality of convex portions and a plurality of liquid crystal portions configured to each include liquid crystal molecules filled in between the concave portions. Also, the liquid crystal lens film comes in contact with the adhesive layer.

In one embodiment, the convex portion is a quadratic function shape and the adhesive layer is in contact with to a vertex of the convex portion. The adhesive layer includes adhesive capsules. The adhesive capsules are dispersed in the adhesive layer. Also, the adhesive capsule is composed of a single layer structure or a core-shell structure. Moreover, the adhesive capsule includes a shell composed of a conductive material.

An image display device according to still another general aspect of the embodiments includes: the above-mentioned liquid crystal lens film structure; and a display panel under the liquid crystal lens film structure.

A fabrication method of an liquid crystal lens film structure according to further still another general aspect of the embodiments includes: forming electrode layers on a first substrate and a second substrate; forming a resin layer, which includes one of pluralities of concave portions and convex portions, on one of the first substrate and the second substrate; rubbing a surface of the resin layer in a fixed direction; forming an adhesive layer on one of the first substrate and the second substrate; forming liquid crystal portions by filling liquid crystal molecules into the concave portions or in between the convex portions; and combining the first and second substrates with each other.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
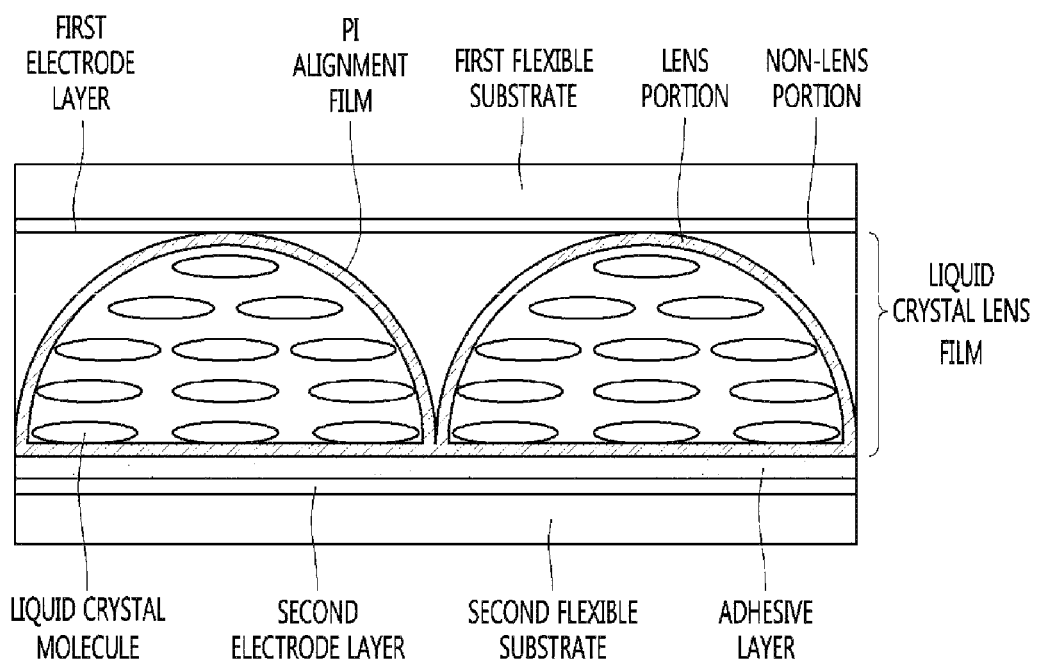
FIG. 1 is a cross-sectional view showing a structure of a liquid crystal lens array which is used in a glasses-free stereoscopic 3-D image display device according to the related art.
Figure 2:
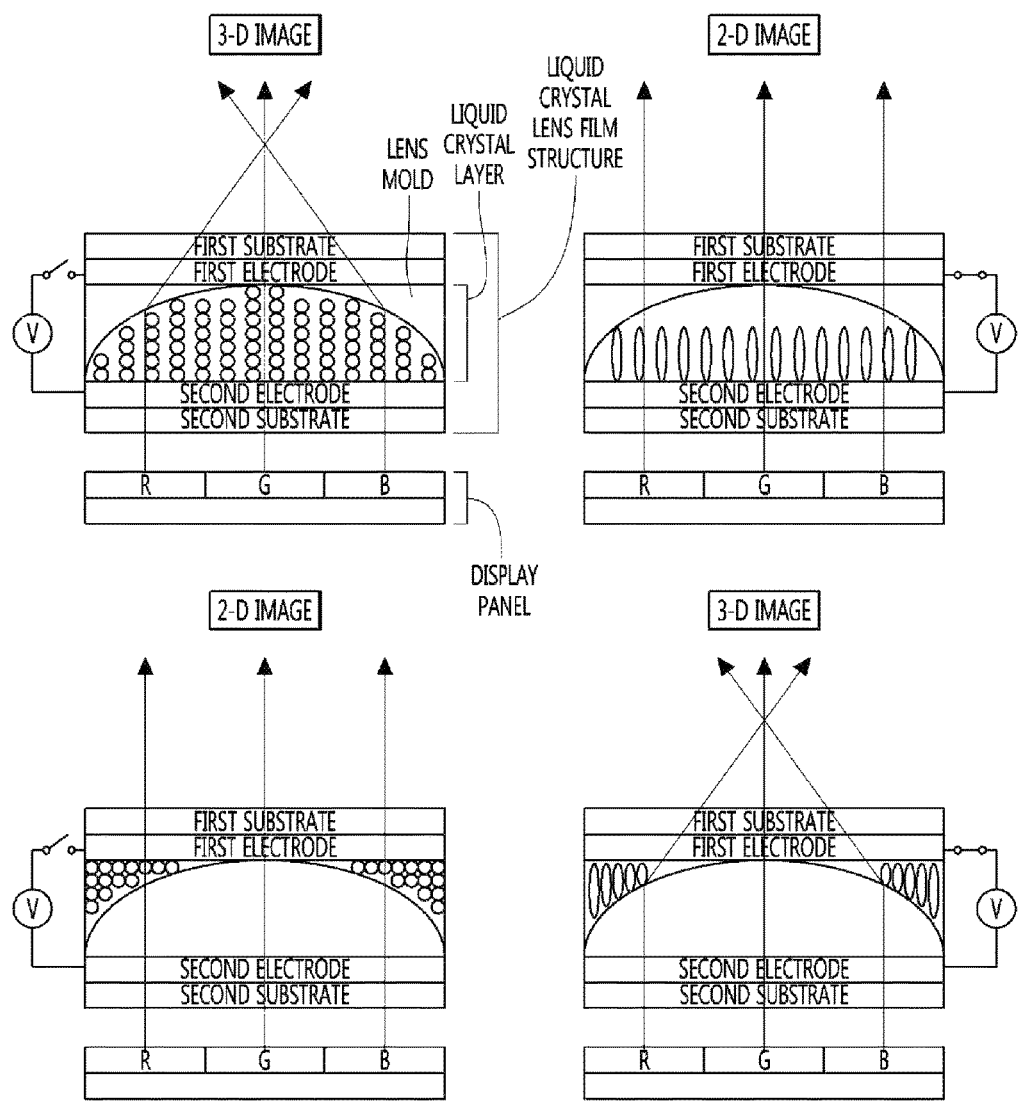
FIG. 2 is a cross-sectional view illustrating a method of displaying 2-D and 3D images by the glasses-free stereoscopic 3-D image display device which uses the related art liquid crystal lens array.
Figure 3:
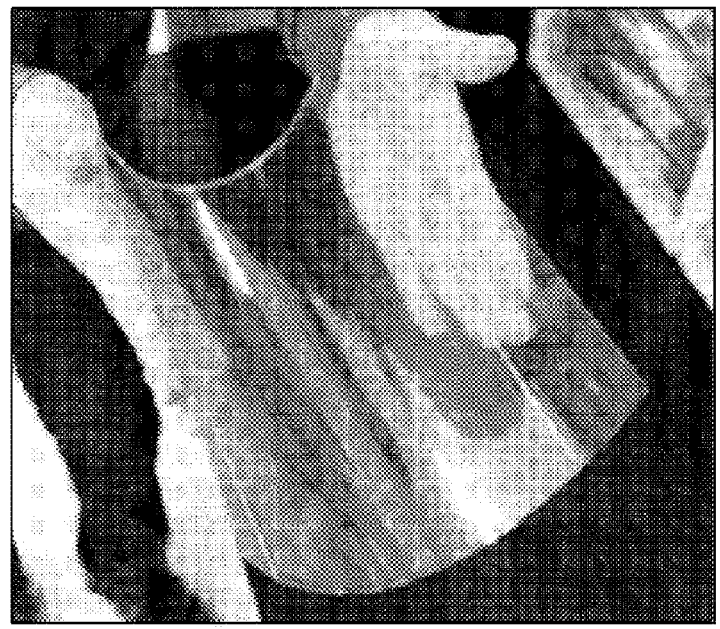
FIG. 3 is a photograph showing a curl generated in a liquid crystal lens film structure including a liquid crystal lens film of the related art.
Figure 4A:
FIG. 4A is a photograph showing an alignment state of liquid crystal molecules in a liquid crystal lens film structure of the related art which is fabricated using a high temperature polyimide process.
Figure 4B:
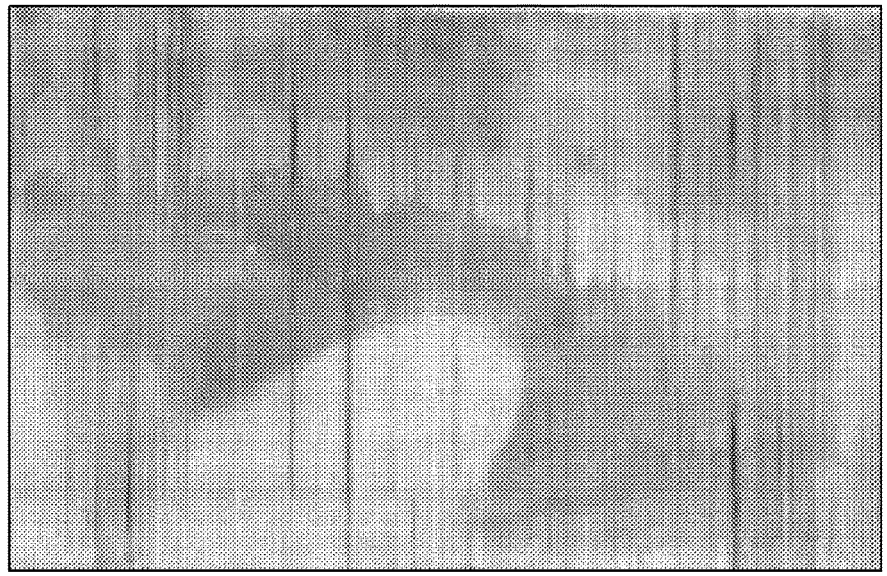
FIG. 4B is a photograph showing a poor alignment state of liquid crystal molecules in a liquid crystal lens film structure of the related art which is fabricated without a high temperature polyimide process.

Reference will now be made in detail to embodiments of the present disclosure, examples of which are illustrated in the accompanying drawings. These embodiments introduced hereinafter are provided as examples in order to convey their spirits to the ordinary skilled person in the art. Therefore, the present disclosure is not limited to these embodiments described here and the accompanying drawings. In the drawings, the size, thickness and so on of a device can be exaggerated for convenience of explanation.

In the following description, numerous specific details are set forth, such as particular structures, sizes, ratios, angles, coefficients and so on, in order to provide an understanding of the various embodiments of the present disclosure. However, it will be appreciated by one of ordinary skill in the art that the various embodiments of the present disclosure may be practiced without these specific details. The same reference numbers will be used throughout this disclosure to refer to the same or like parts. In other instances, well-known technologies have not been described in detail in order to avoid obscuring the present disclosure.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the singular forms "a", "an" and "the" are intended to include the plural forms as well, unless the context clearly indicates otherwise.

Elements used in the present disclosure without additional specific details must be considered to include tolerance.

In the description of embodiments, when a structure is described as being positioned "on or above" or "under or below" another structure, this description should be construed as including a case in which the structures contact each other as well as a case in which a third structure is disposed therebetween.

The temporal terms of "after", "subsequently", "next", "before" and so on used in this disclosure without specifying "immediately" or "directly" can include other discontinuously temporal relations.

Moreover, although some of the elements are designated with numerical terms (e.g., first, second, third, etc.), it should be understood that such designations are only used to specify one element from a group of similar elements, but not to limit the element in any specific order. As such, an element designated as a first element could be termed as a second element or as third element without departing from the scope of exemplary embodiments.

The features of various exemplary embodiments of the present disclosure may be partially or entirely bound or combined with each other, and be technically engaged and driven using various methods as apparent to those skilled in the art, and the exemplary embodiments may be independently practiced alone or in combination.

Liquid Crystal Lens Film Structure and Fabrication Method Thereof

A liquid crystal lens film structure according to a first embodiment of the present disclosure includes a first substrate, a second substrate disposed to face the first substrate, an adhesive layer on the second substrate, and a liquid crystal lens film between the first substrate and the adhesive layer. The liquid crystal lens film includes a plurality of concave portions and a plurality of liquid crystal portions which each include liquid crystal molecules filled in the respective concave portion. The adhesive layer is in contact with the liquid crystal lens film.

Figure 6A:
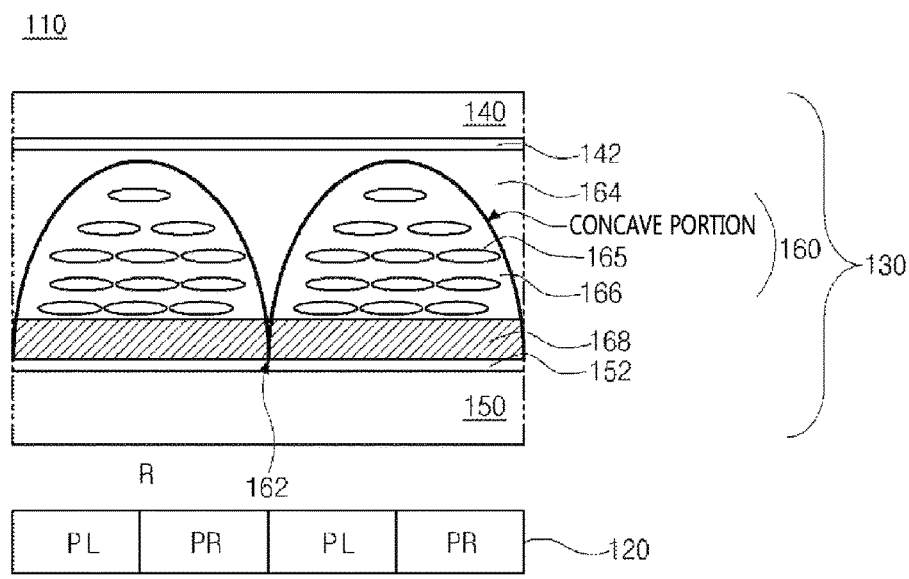
FIG. 6A is a cross-sectional view schematically showing an image display device which includes a liquid crystal lens film structure according to a first embodiment of the present invention.
Figure 6B:
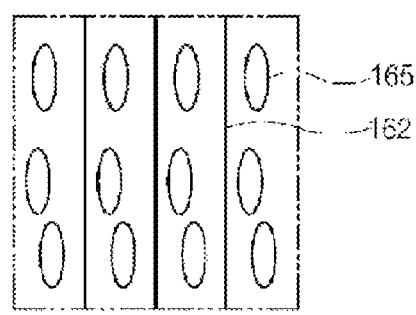
FIG. 6B is a planar view schematically showing a liquid crystal lens film structure according to a first embodiment of the present invention.
Figure 6C:
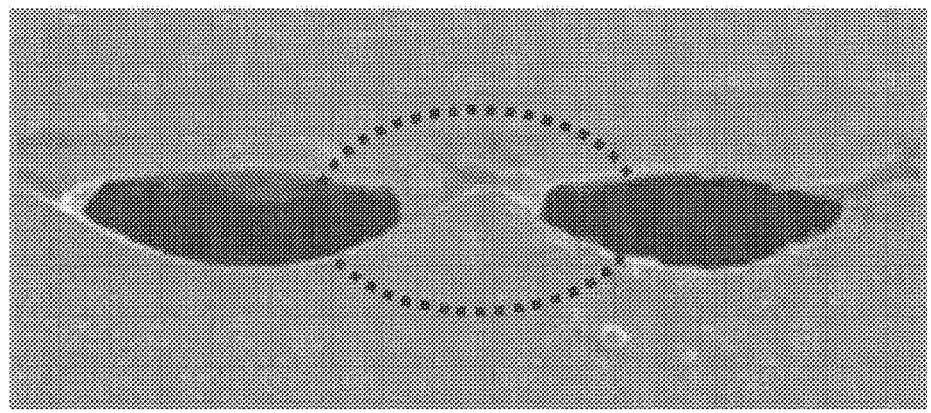
FIG. 6C is a photograph a liquid crystal lens film structure according to a first embodiment of the present invention.

FIG. 6A is a cross-sectional view schematically showing an image display device which includes a liquid crystal lens film structure according to a first embodiment of the present disclosure. FIG. 6B is a planar view schematically showing a liquid crystal lens film structure according to a first embodiment of the present disclosure. FIG. 6C is a photograph a liquid crystal lens film structure according to a first embodiment of the present disclosure.

The first substrate 140 according to the present disclosure is used to apply an electric field to the liquid crystal lens film 160. The first substrate 140 is disposed on the liquid crystal lens film 160.

Such a first substrate 140 is (or should be) formed from a flexible material. As such, the first substrate 140 can be a film substrate. For example, the first substrate 140 can be a plastic film formed from a high polymer resin. The high polymer resin can include one or more of polyethyleneterephthalate, polycarbonate, polyimide, polyamide, polyurethane, polymethylmethacrylate, polyvinyl alcohol and acrylonitrile-butadiene-styrene resins.

Also, the first substrate 140 can include a first electrode layer 142. The first electrode layer 142 is formed by depositing a transparent conductive material on the entire surface of the first substrate 140.

The first electrode layer 142 can include a plurality of first electrodes separated from one another. Alternatively, the first electrode layer 142 can include a first sub-layer, a second sub-layer under the first sub-layer and a third sub-layer under the second sub-layer. The first sub-layer includes a plurality of primary electrodes separated from one another. The second sub-layer is formed from an insulation material. The third sub-layer includes a plurality of secondary electrodes separated from one another. In this case, the plural primary electrodes are disposed opposite to intervals between the plural secondary electrodes, and the plural secondary electrodes are disposed opposite to intervals between the plural primary electrodes. In other words, the plural primary electrodes and the plural secondary electrodes can be arranged alternately with each other.

Moreover, a resin layer 164 with the plurality of concave portions is disposed on the first substrate 140 provided with the first electrode layer 142. The resin layer 164 with the plurality of concave portions can be formed by coating a transparent organic resin material, such as an acrylic resin, in a fixed thickness on the first substrate 140 provided with the first electrode layer 142 and then imprinting the coated transparent organic resin material with an imprinting roller.

Continuously, an alignment treatment is performed for the resin layer 164 using a rubbing roller. The rubbing roller can have a cylinder shape wound with a rubbing fabric. Such a rubbing roller rotates in a fixed rotation direction and rubs with surface of the concave portion, thereby forming microgrooves in the surface of the concave portion. In this way, the alignment treatment can be performed for the resin layer 164. As such, the resin layer 164 with the alignment-treated concave portions can be formed. Also, the resin layer 164 includes vertex portions 162 between the concave portions. The vertex portion 162 corresponds to a boundary portion between adjacent concave portions to each other. Such vertex portions 162 can come in contact with the adhesive layer 168.

Subsequently, the liquid crystal molecules 165 are filled in the concave portions. In accordance therewith, the first substrate 140 provided with the liquid crystal lens film 166 can be completed.

The second substrate 150 according to the present disclosure is used to support the liquid crystal lens film 166 (or the first substrate 140 provided with the liquid crystal lens film 166). Such a second substrate 150 must be formed from a flexible material. As such, the second substrate 150 can be a film substrate. For example, the second substrate 150 can be a plastic film formed from a high polymer resin. The high polymer resin can includes polyethyleneterephthalate, polycarbonate, polyimide, polyamide, polyurethane, polymethylmethacrylate, polyvinyl alcohol and acrylonitrile-butadiene-styrene resins.

Also, the second substrate 150 can include a second electrode layer 152. The second electrode layer 152 is formed by depositing a transparent conductive material on the entire surface of the second substrate 150.

Subsequently, the adhesive layer 168 capable of an alignment property is attached onto the second electrode layer 152 using a roller. The rollers can be laminating and rubbing rollers.

The adhesive layer 168 can be used to not only align the liquid crystal molecules of the liquid crystal lens film 166 but also attach the liquid crystal lens film 166 and the second substrate 150 to each other. To this end, the adhesive layer 168 is attached onto the second substrate 150 provided with the second electrode layer 152, using the laminating roller.

Continuously, the adhesive layer 168 is alignment-treated using the rubbing roller. The rubbing roller can have a cylinder shape wound with a rubbing fabric. Such a rubbing roller rotates in a fixed rotation direction and rubs with the surface of the adhesive layer 168, thereby forming microgrooves in the surface of the adhesive layer 168. In this way, the alignment treatment can be performed for the adhesive layer 168. As such, the adhesive layer 168 with the alignment property can be formed. In accordance therewith, the liquid crystal molecules of the liquid crystal lens film 160 can be aligned in a fixed direction by the adhesive layer 168 without any additional alignment film. The rubbing direction of the adhesive layer 168 can be the same as or orthogonal to that of the resin layer 164.

Such an adhesive layer 168 decreases the number of fabrication processes of the liquid crystal lens film structure 130 and shortens fabrication time of the liquid crystal lens film structure 130. As such, productivity and efficiency of the liquid crystal lens film structure 130 can be enhanced. In detail, an ordinary alignment film can be formed by performing an alignment layer formation process using a coating method, an alignment treatment process and a hardening procedure which includes a preliminary hardening process and a main hardening process. However, the liquid crystal lens film structure 130 according to a first embodiment of the present disclosure uses the adhesive layer 168 without any additional alignment film. As such, the alignment layer formation process and the hardening procedure necessary to form the alignment film can be omitted.

Figure 7:
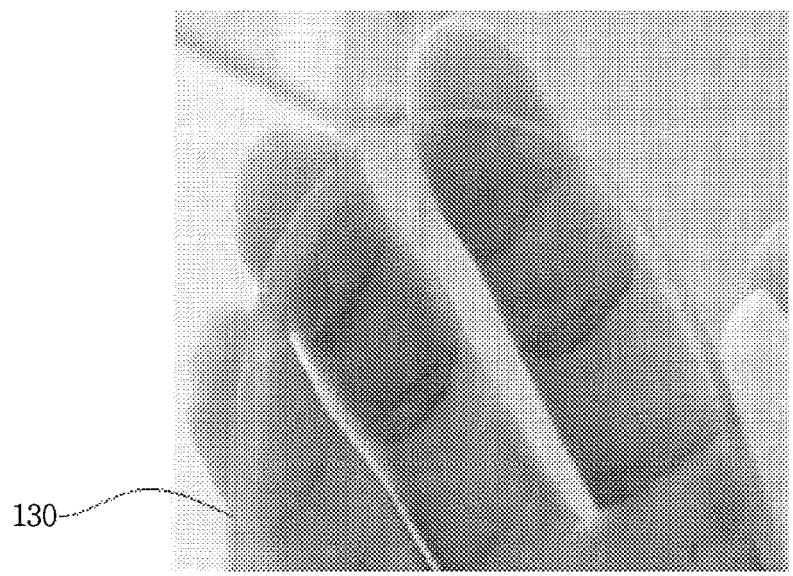
FIG. 7 is a photograph showing a bent state of the liquid crystal lens film structure according to a first embodiment of the present invention.
Figure 8:
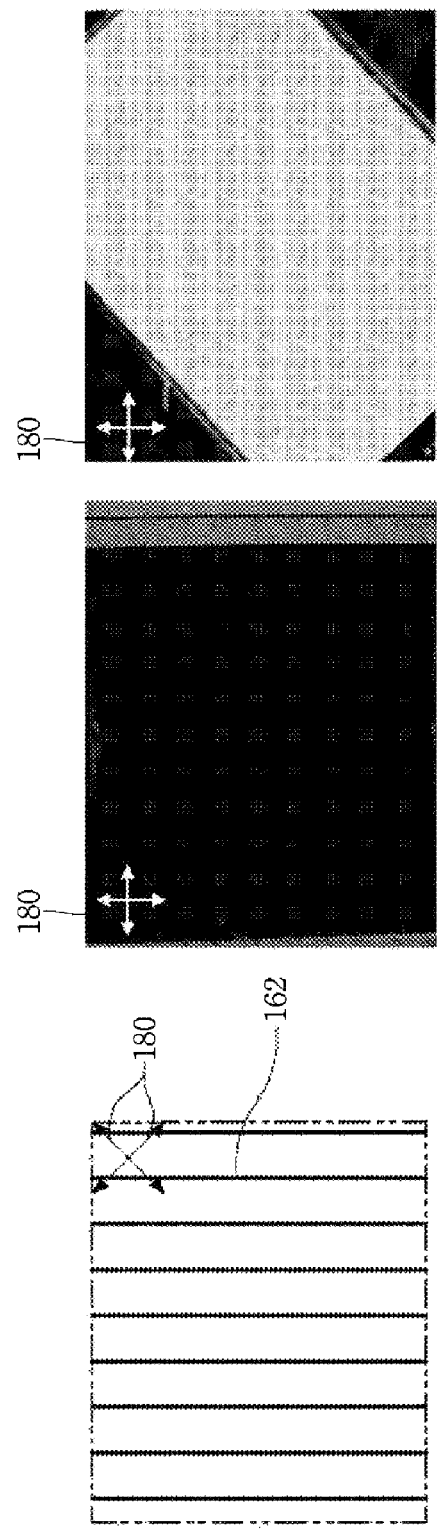
FIG. 8 is a planar view illustrating an alignment property of liquid crystal molecules in the liquid crystal lens film structure according to a first embodiment of the present invention.

FIG. 7 is a photograph showing a bent state of the liquid crystal lens film structure according to a first embodiment of the present disclosure. FIG. 8 is a planar view illustrating an alignment property of liquid crystal molecules in the liquid crystal lens film structure according to a first embodiment of the present disclosure.

The first substrate 140 prepared through the first substrate fabrication procedure and the second substrate 150 prepared through the second substrate fabrication procedure are combined with each other by first and second rollers. More specifically, the first substrate 140 and the second substrate 150 are disposed to face each other, and the first and second rollers are positioned on outer surfaces of the first substrate 140 and the second substrate 150. Also, the first substrate 140 and the second substrate 150 are heated at the temperature of below 100 and compressed by the first and second rollers. In accordance therewith, the first substrate 140 and the second substrate 150 interposed between the first and second rollers are combined with each other.

In this case, the adhesive layer 168 on the second substrate 150 is served as a sealant. In detail, the adhesive layer 168 attached onto the entire surface of the second substrate 150 has cohesive and adhesive properties. The resin layer 164 on the first substrate 140 is partially stuck in the adhesive layer 168 by a pressure applied from the first and second rollers. More specifically, the vertex portions 162 of the resin layer on the first substrate 140 are stuck in the adhesive layer 168 by a pressure applied from the first and second rollers.

Since the vertex portions 162 between the concave portions are stuck into the adhesive layer 168, the first substrate 140 and the second substrate 150 can be firmly combined with each other. As such, a curling phenomenon forcing one of the combined first and second substrates 140 and 150 to be partially curled can be completely prevented.

Figure 5A:
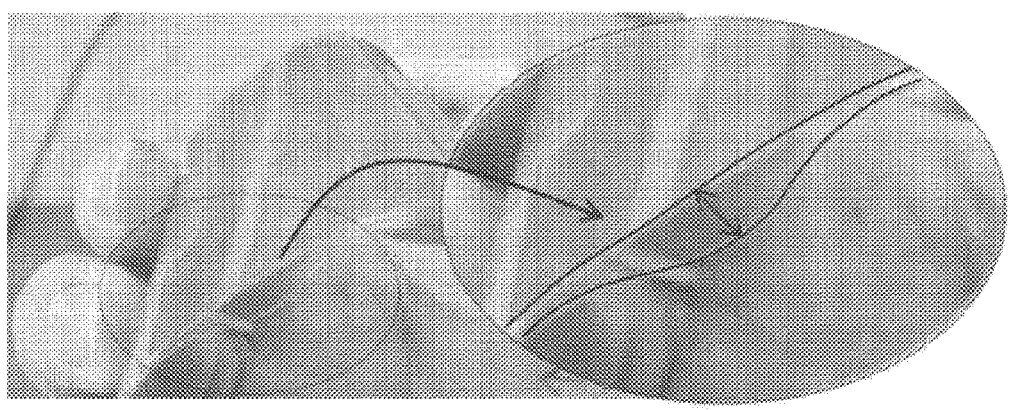
FIG. 5A is a photograph showing a separate state of upper and lower substrates when a liquid crystal lens film structure with a liquid crystal lens film is bent according to the related art.
Figure 5B:
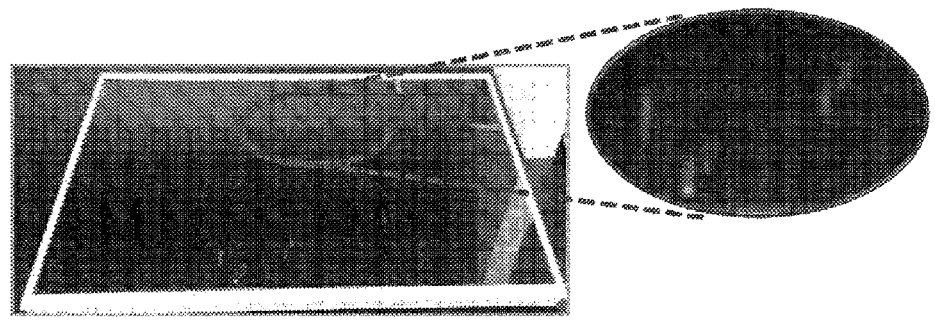
FIG. 5B is a photograph showing a concentrated state of liquid crystal molecules in a liquid crystal lens film structure of the related art.

If the first substrate 140 and the second substrate 150 are combined with each other only in such a manner of bring the vertex portions 162 in contact with the surface of the adhesive layer 168, a gap (an opening phenomenon) is generated between the liquid crystal lens film 160 and the adhesive layer 168 when the liquid crystal lens film structure 130 is bent by an external force as shown in FIG. 5A. Due to this, the liquid crystal molecules can be leaked.

However, the first and second substrates 140 and 150 in the liquid crystal lens film structure 130 according to a first embodiment of the present disclosure are combined with each other by sticking the vertex portions 162 into the adhesive layer 168. As such, the liquid crystal lens film 160 and the adhesive layer 169 can be firmly bonded to each other. In accordance therewith, any one of the curling and opening phenomena is not generated in the liquid crystal lens film structure 130 even though the liquid crystal lens film structure 130 is bent by an external force as shown in FIG. 7. In other words, an adhesive strength between the first and second substrates 140 and 150 (or upper and lower substrates) can be enhanced. Therefore, the deterioration of image quality due to a lumping or concentrating phenomenon of the liquid crystal material (or molecules) can be prevented.

The alignment property of the liquid crystal lens film structure will now be described with reference to FIG. 8. Referring to FIG. 8, crossed polarizers are used to confirm whether the liquid crystal molecules of the liquid crystal lens film structure according to a first embodiment of the present disclosure are aligned along an axis direction.

As shown in FIG. 8, the liquid crystal lens film structure is interposed between the crossed polarizers 180 in order to confirm the alignment property of the liquid crystal lens film structure. If the alignment direction of the liquid crystal molecules within the liquid crystal lens film structure 130 has an angle difference of 45° with respect to transmission and absorption axes of the crossed polarizers 180, the liquid crystal molecules is viewed to an observer due to a light leak phenomenon. When the alignment direction of the liquid crystal molecules is parallel to one of the transmission and absorption axes of the crossed polarizers 180, one of a uniform black image and a uniform white image is displayed. In this way, the alignment property of the liquid crystal lens film structure can be confirmed.

Such a liquid crystal lens film structure 130 according to the present disclosure can use a low heat-resistant films as base substrates (i.e., as the first and second substrates 140 and 150). This results from the fact that the liquid crystal lens film structure 130 according to the present disclosure is unnecessary to form an additional alignment film. As such, the liquid crystal lens film structure 130 can use a low temperature hardening process of below 100° C. and be unnecessary to employ a high heat-resistant film. In detail, an ordinary alignment film is formed by coating a polyimide layer and hardening the coated polyimide layer using heat of above 200° C. However, the liquid crystal lens film structure 130 of the present disclosure can remove the alignment film because it uses the adhesive layer 168 with the alignment property. Also, since the liquid crystal lens film structure 130 of the present disclosure does not require the high temperature hardening process of above 200° C., low heat-resistant films can be applied to the liquid crystal lens film structure 130. As such, it is unnecessary for the liquid crystal lens film structure 130 to use a high heat-resistant film which is a relatively high price but a lower price than that of a glass substrate. Therefore, the liquid crystal lens film structure 130 can be fabricated at a low cost.

Also, the liquid crystal lens film structure 130 according to a first embodiment of the present disclosure can become lighter and thinner as the ordinary alignment film is removed. Moreover, the deterioration of image quality caused by using the flexible substrate can be prevented because the adhesive layer has at least a liquid crystal alignment property of the ordinary (or the related art) alignment film. Furthermore, the liquid crystal lens film structure 130 can prevent an opening or curling phenomenon of lenses and secure process stability.

A sealant pattern can be formed along an edge of the first substrate 140 or the second substrate 150. As such, the edges of the first and second substrates 140 and 150 are combined with each other by the sealant pattern, and inner central areas of the first and second substrates 140 and 150 corresponding to the inward of the edge are combined with each other by the adhesive layer 168.

The adhesive layer 168 according to a first embodiment of the present disclosure can include at least one selected from a material group which includes an epoxy-based compound, an acrylic-based compound, a phenoxy-based compound and a thiol compound. In this case, the adhesive layer 168 can have a thermosetting property or a photo-curing property.

As needed, the adhesive layer 168 can further include at least one selected from a material group which includes a transparent conductive material and silica. In this case, adhesive and conductive properties of the adhesive layer 168 can be largely enhanced.

Preferably, the adhesive layer 168 further includes a matrix resin and adhesive capsules scattered (or dispersed) into the matrix resin. The adhesive capsules can be served to reinforce an adhesive strength between the second substrate 150 and the liquid crystal lens film 160.

In order to provide the liquid crystal alignment property, the adhesive layer 168 is preferably formed from a material which is capable of being aligned in a direction through a rubbing process. In this case, it is unnecessary to form an additional alignment film such as a polyimide layer.

On the other hand, the adhesive capsule smashes or crushes by a pressure and develops the adhesive strength. In detail, the adhesive capsule can smash or crush by an external pressure which is applied for laminating a display panel 120 and the liquid crystal lens film structure 130. Then, an adhesive component is discharged from the smashed or crushed capsule. In accordance therewith, the adhesive strength is generated.

The liquid crystal lens film 150 according to a first embodiment of the present disclosure includes the vertex portions 162 as described above. The pressure applied at the lamination is concentrated in the vertex portion 162. Then, some adhesive capsules opposite to the vertex portion 162 mainly smash or crush, but the other adhesive capsules opposite a central region of the lens (i.e., the concave portion) hardly smash or crush. As such, the adhesive component is concentrically distributed in a region of the adhesive layer 168 opposite to the vertex portion 162 between the lenses (or the concave portions), but the capsulated adhesive component within the other region of the adhesive layer opposite to the central area of the lens (or the concave portion) exists as it is. In this manner, the adhesive layer 168 of the present disclosure enables the adhesive component to be not exposed (or discharged) to the central area of the lens (or the concave portion). In accordance therewith, the deterioration of a liquid crystal alignment property due to the adhesive component can be prevented.

Such an adhesive capsule can be formed from a monomer, which includes an adhesive component, and in a bead shape, but it is not limited to this. For example, the adhesive capsule can be formed in the bead shape by reacting an expoxy-based monomer and active hydrogen at the same equivalent. Also, the adhesive capsule fabricated using the above-mentioned method includes a unit derived from the epoxy-based monomer. In this case, the epoxy-based monomer can be an alicyclic epoxy monomer. More preferably, the epoxy-based monomer can be a compound represented by the following formula 1.

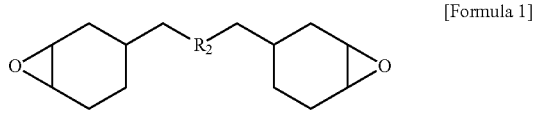

[Formula 1]

In the formula 1, "R2" can be one selected from a hydrogen atom, a substituted C1 to C10 straight-chain and branched-chain alkylene group and an un-substituted C1 to C10 straight-chain and branched-chain alkylene group.

Also, the adhesive capsules are preferably included in the adhesive layer 168 by about 10~40 weight % compared to the entire weight of the adhesive layer 168. If the adhesive capsules corresponding to the content of below 10 weight % are included, the adhesive layer 168 is difficult to sufficiently secure the adhesive strength. When the adhesive capsules exceed the content of 40 weight %, a haze can be generated in the adhesive layer 168 due to the adhesive capsules. In this case, the image quality can deteriorate.

Moreover, the adhesive capsule preferably has an average diameter range of about 1~10 μm. If the average diameter of the adhesive capsule is below 1 μm, the adhesive capsule is rarely broken. When the average diameter of the adhesive capsule is above 10 μm, the alignment of the liquid crystal molecules can deteriorate.

Furthermore, the adhesive capsule can be formed as (or composed of) a single layer. Alternately, the adhesive capsule can be formed in a core-shell structure.

Figure 9A:
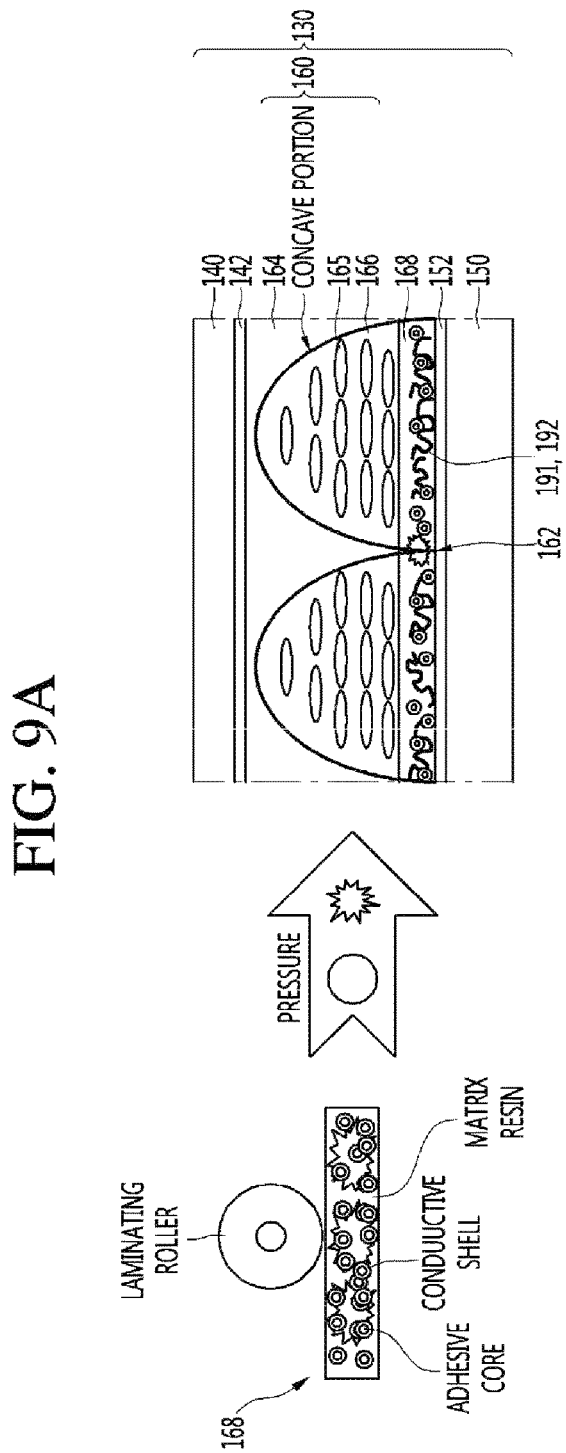
FIG. 9A is a cross-sectional view illustrating a method of applying an adhesive layer, which includes adhesive capsules of a core-shell structure, to a liquid crystal lens film structure according to a first embodiment of the present invention.
Figure 9B:
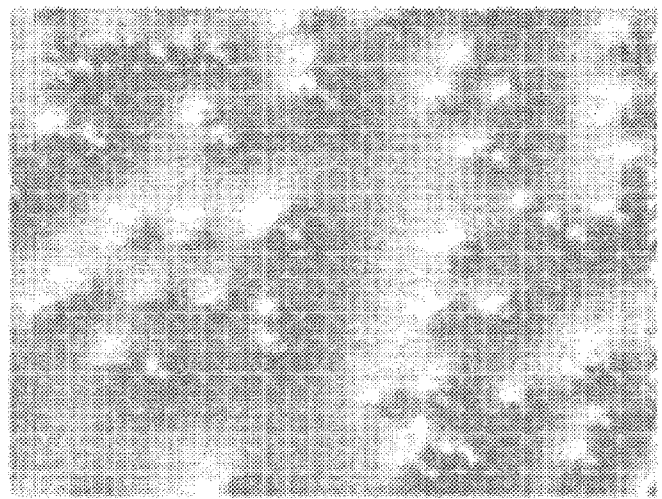
FIG. 9B is a photograph showing a part of an adhesive layer in FIG. 9A.

FIG. 9A is a cross-sectional view illustrating a method of applying an adhesive layer, which includes adhesive capsules composed of (or formed in) a core-shell structure, to a liquid crystal lens film structure according to a first embodiment of the present disclosure. FIG. 9B is a photograph showing a part of an adhesive layer in FIG. 9A.

As shown in FIG. 9A, the adhesive capsule of the present disclosure can be formed in (or composed of) the core-shell structure which further includes a shell formed from a conductive material.

The adhesive layer 168 including a high polymer has non-conductivity due to its material properties. As such, the driving voltage of the liquid crystal lens film structure 130 must become higher. To address this matter, the adhesive layer 168 of the present disclosure can include the adhesive capsules which are each formed in the core-shell structure further including the conductive shell. In this case, the adhesive layer 168 can have conductivity. As such, the driving voltage of the liquid crystal lens film structure 130 can become lower.

The core can be formed from a monomer, which includes an adhesive component, and in a bead shape, but it is not limited to this. For example, the core can be formed by reacting an expoxy-based monomer and active hydrogen at the same equivalent. In this case, the core includes a unit derived from the epoxy-based monomer. In this case, the epoxy-based monomer can be an alicyclic epoxy monomer. More preferably, the epoxy-based monomer can be a compound represented by the following formula 1.

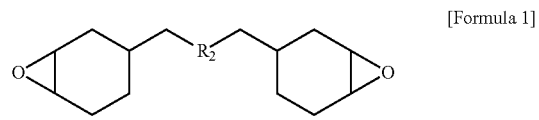

[Formula 1]

In the formula 1, "R2" can be one selected from a hydrogen atom, a substituted C1 to C10 straight-chain and branched-chain alkylene group and an un-substituted C1 to C10 straight-chain and branched-chain alkylene group.

The conductive shell can be formed by coating a conductive material on the core using a plating method. The conductive material can be one of nickel Ni, copper Cu, aluminum Al, silver Ag and so on. Since the adhesive capsule including the conductive shell is used in the adhesive layer 168, the adhesive layer 168 can have conductivity. As such, a voltage can be applied to the liquid crystal molecules without interposing forming an electrode between the second substrate 150 and the liquid crystal lens film 160.

On the other hand, the adhesive capsule formed in a single layer can be used in the adhesive layer 168. In this case, in order to apply a voltage to the liquid crystal molecules, it is preferred to interpose an electrode layer 152 between the second substrate 150 and the adhesive layer 168.

The liquid crystal lens film 160 included in the liquid crystal lens film structure of the present disclosure realizes 3-D image by providing a parallax to light input from the display panel 120. The liquid crystal lens film 160 is disposed on the adhesive layer 168 in such a manner as to be in contact with the adhesive layer 168. Such a liquid crystal lens film 160 includes liquid crystal molecules 165 which are aligned in different directions according whether or not an electric field is applied. In detail, the liquid crystal lens film 160 includes a resin layer 164 configured to include a plurality of concave portions and a plurality of liquid crystal portions 166 which includes the liquid crystal molecules 165 filled in the concave portions. The liquid crystal molecules 165 can be aligned in a fixed direction by the adhesive layer 168 and realigned in a specific direction when an electric field is applied.

The resin layer 154 can be formed from a material which has the same refractive index as an ordinary refractive index of the liquid crystal molecule 165. For example, the resin layer 154 can be formed from a high polymer or others.

Although the concave portion can be a lenticular lens shape, it is not limited to this. In other words, the concave portion can be formed in a variety of shapes without departing from the spirit (or object) of the present disclosure. For example, the concave portion can be formed in one of semicircular, cylindrical and polygonal shapes.

Figure 10:
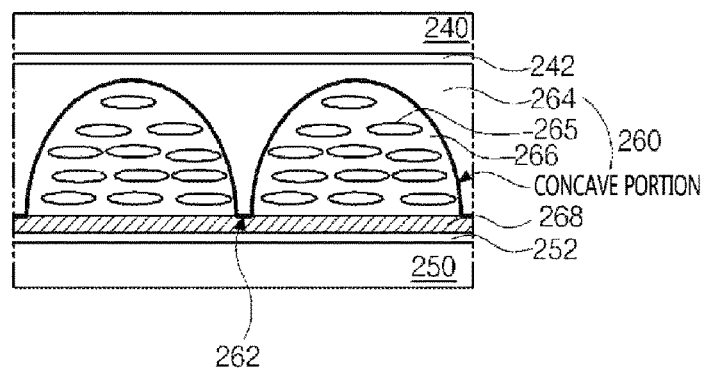
FIG. 10 is a cross-sectional view schematically showing a liquid crystal lens film structure according to a second embodiment of the present invention.
Figure 11:
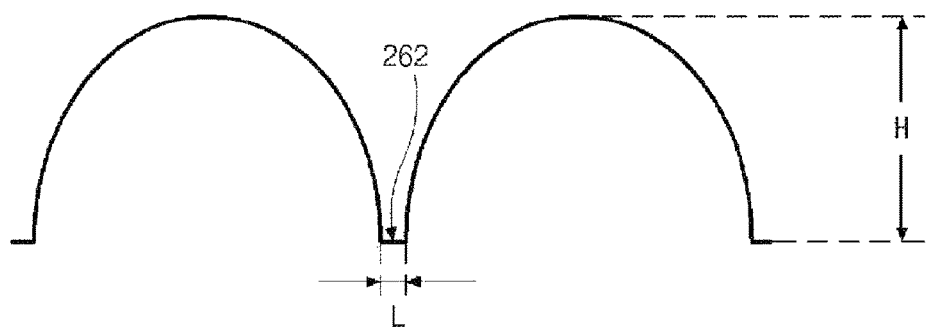
FIG. 11 is a cross-sectional view largely showing concave portions of the liquid crystal lens film structure according to a second embodiment of the present invention.

FIG. 10 is a cross-sectional view schematically showing a liquid crystal lens film structure according to a second embodiment of the present disclosure. FIG. 11 is a cross-sectional view largely showing concave portions of the liquid crystal lens film structure according to a second embodiment of the present disclosure.

The liquid crystal lens film structure according to a second embodiment of the present disclosure includes the same components as that of FIGS. 6A through 6C with the exception of a liquid crystal lens film 260 and an adhesive layer 268. The description of the same components as those of FIGS. 6A through 6C will be omitted or brief.

As shown in FIG. 10, the liquid crystal lens film structure 230 according to a second embodiment of the present disclosure includes a liquid crystal lens film 260 and first and second substrates 240 and 250 which are opposite to and separate from each other. The first substrate 240 includes a first electrode layer 242 and the liquid crystal lens film 260 disposed on the first electrode layer 242. The second substrate 250 includes a second electrode layer 252 and an adhesive layer 268 disposed on the second electrode layer 252.

The first electrode layer 242 is interposed between the first substrate 240 and the liquid crystal lens film 260. The second electrode layer 252 is interposed between the second substrate 250 and the adhesive layer 268.

The liquid crystal lens film 260 includes a resin layer 264 configured to include a plurality of concave portions and a plurality of horizontal portions 262 between the concave portions, and liquid crystal molecules 265 filled in the concave portions. The horizontal portions 262 can connect the concave portions with one another.

The plural horizontal portions 262 can separate the plural concave portions from one another. As shown in FIG. 11, each of the plural horizontal portions 262 can have a width L suitable to sufficient secure its contact area with the adhesive layer 268.

In detail, the liquid crystal lens film structure 130 according to a first embodiment of the present disclosure enables the vertex portions 162 between the concave portions to be stuck into the adhesive layer 168. Then, the inner areas of the first and second substrates 140 and 150 can be firmly combined with each other. As such, the combinative property of the first and second substrates 140 and 150 can be enhanced. Alternately, the liquid crystal lens film structure according to a second embodiment of the present disclosure allows the horizontal portions 262 formed between the concave portions to be directly adhered to the adhesive layer 268. As such, the inner areas of the first and second substrates 240 and 250 can be firmly combined with each other. In accordance therewith, the combinative property of the first and second substrates 240 and 250 can be enhanced.

The width L of the horizontal portion 262 is preferably determined in consideration of a contact area of the horizontal portion 262 with the adhesive layer 268 and a size of the liquid crystal portion 266 (or a space size of the concave portion). The more the width is enlarged, the more not only the contact area of the horizontal portion 262 with the adhesive layer 268 is increased but also the combination property of the first and second substrates 240 and 250 is enhanced. However, as the width L of the horizontal portion 262 is enlarged, the size of the liquid crystal portion 266 must become smaller in that degree. Then, the liquid crystal molecules filled in the concave portion must be decreased. Due to this, a light leak fault such as crosstalk can be generated. In view of this point, the width L of the horizontal portion 262 is preferably set to a length not causing the light leak fault such as crosstalk.

The thickness of the adhesive layer 268 can be reduced because the horizontal portions 262 are formed between the concave portions. Also, the horizontal portions 262 between the concave portions can allow the thickness of the resin layer 264, the radius H of the concave portion and the entire thickness of the liquid crystal lens film 260 to be reduced.

More specifically, the liquid crystal lens film structure 130 according to a first embodiment of the present disclosure includes the vertex portions 162 which are disposed between the concave portions and stuck (or inserted) into the adhesive layer 168. On the other hand, the liquid crystal lens film structure 230 according to a second embodiment of the present disclosure includes the horizontal portions 262 which are disposed between the concave portions and directly contact the surface of the adhesive layer 268.

As such, the adhesive layer 168 of the first embodiment must be formed in a relatively large thickness, but the adhesive layer 268 of the second embodiment can be thinly formed. In other words, the adhesive layer 268 of the second embodiment can be formed in a smaller thickness compared to that of the adhesive layer 168 of the first embodiment. Therefore, the reduction of a voltage on the second electrode layer 252 due to the adhesive layer 268 can be prevented or minimized.

Moreover, the radius H of the concave portion of the second embodiment can be smaller compared to that of the concave portion of the first embodiment. In accordance therewith, not only the thicknesses of the resin layer 264 and the entire thickness of the liquid crystal lens film 260 in the second embodiment can become smaller compared to those of the first embodiment, but also the quantity of the liquid crystal molecules 265 filled in the concave portion can be reduced. Also, the liquid crystal lens film structure 230 of the second embodiment can be thinner than that of the first embodiment. Therefore, a lighter and thinner image display device can be implemented, and a cost for parts of the image display device and an entire fabrication cost of the image display device can be reduced.

The plurality of horizontal portions 262 can prevent the generation of crosstalk. In detail, the horizontal portion 262 disposed between the concave portions adjacent to each other increases the distance between the adjacent concave portions. As such, the liquid crystal lens film structure 230 of the second embodiment can enable the vertex portions 162 to be not generated between the concave portions, unlike that of the first embodiment. In accordance therewith, the generation of crosstalk due to the vertex portions can be prevented. Therefore, clear 3-D images can be viewed to users.

A liquid crystal lens film structure according to still another embodiment of the present disclosure includes a first substrate, a second substrate disposed to face the first substrate, an adhesive layer disposed on a surface of the first substrate opposite to the second substrate, and a liquid crystal lens film interposed between the adhesive layer and the second substrate. The liquid crystal lens film includes a resin layer configured to include a plurality of convex portions and a liquid crystal portion configured to include liquid crystal molecules which are filled in between the convex portions. The adhesive layer comes in contact with the liquid crystal lens film.

In other words, the liquid crystal lens film structures of the first and second embodiments enable the liquid crystal molecules to be filled in the concave portions. However, in the liquid crystal lens film structure of still another embodiment, the resin layer includes the convex portions and the liquid crystal molecules are filled in between the convex portions.

Figure 12A:
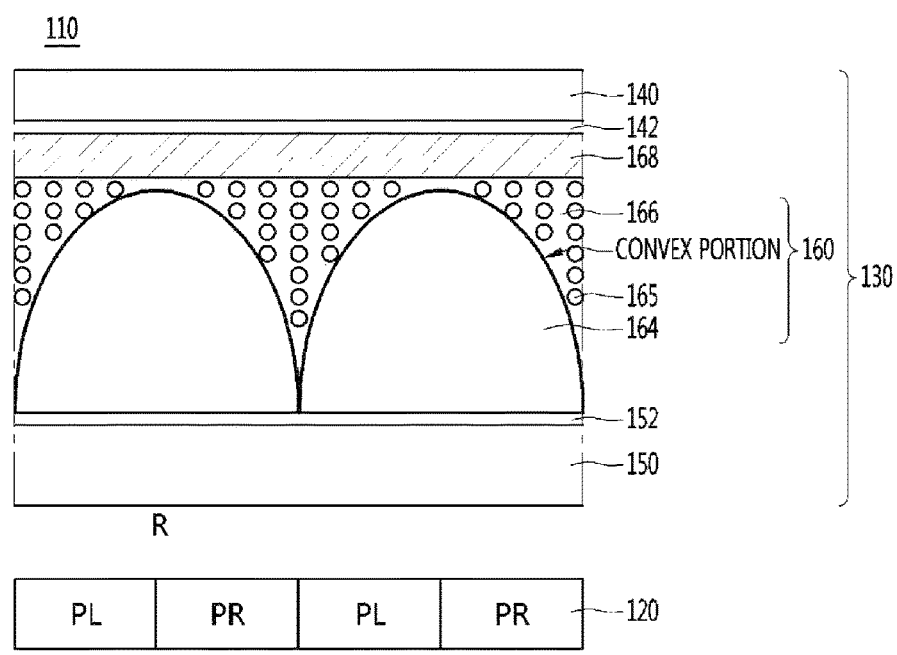
FIG. 12A is a cross-sectional view schematically showing an image display device which includes a liquid crystal lens film structure according to a third embodiment of the present disclosure.
Figure 12B:
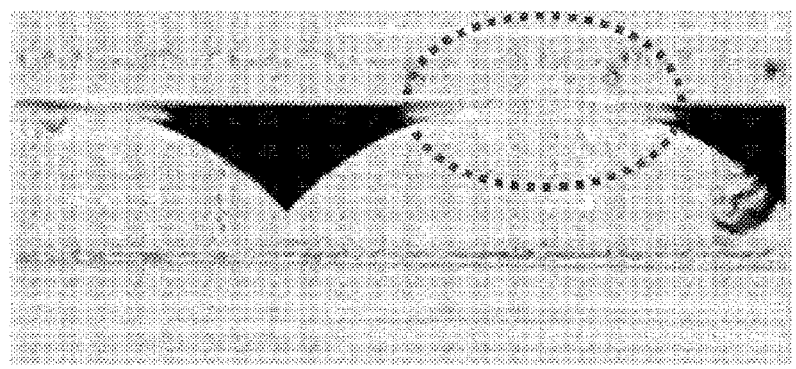
FIG. 12B is a photograph showing a cross-section of a liquid crystal lens film structure according to a third embodiment of the present invention.
Figure 13:
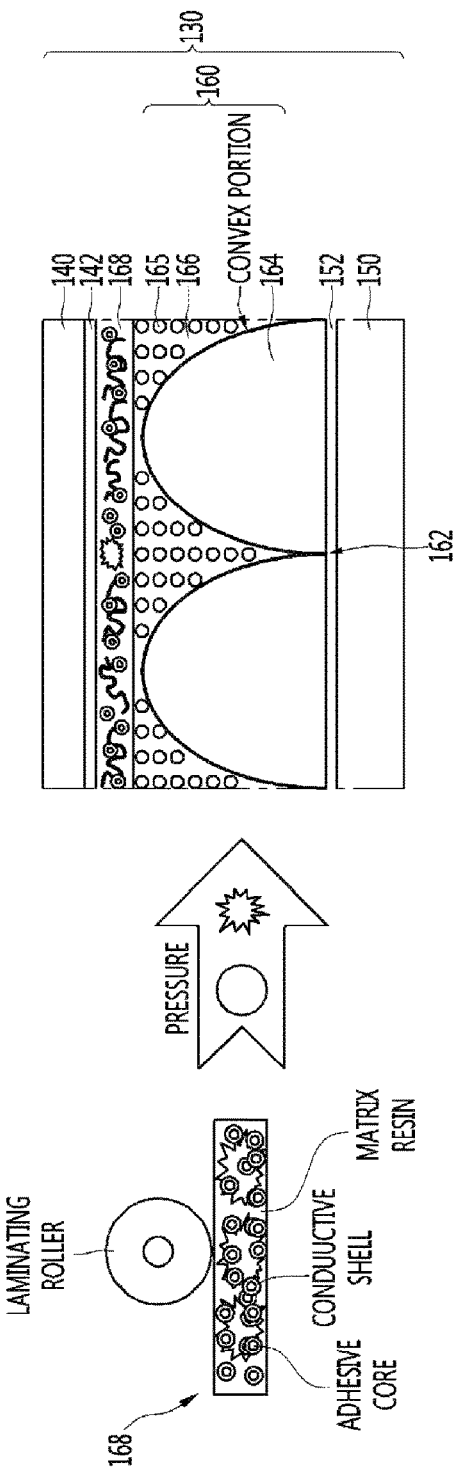
FIG. 13 is a cross-sectional view illustrating a method of applying an adhesive layer, which includes adhesive capsules of a core-shell structure, to a liquid crystal lens film structure according to a third embodiment of the present invention.

FIG. 12A is a cross-sectional view schematically showing an image display device which includes a liquid crystal lens film structure according to a third embodiment of the present disclosure. FIG. 12B is a photograph showing a cross-section of a liquid crystal lens film structure according to a third embodiment of the present disclosure. FIG. 13 is a cross-sectional view illustrating a method of applying an adhesive layer, which includes adhesive capsules of a core-shell structure, to a liquid crystal lens film structure according to a third embodiment of the present disclosure. Referring to FIGS. 12A, 12B and 13, liquid crystal molecules 165 included in the liquid crystal lens film structure 130 are filled in between convex portions of a resin layer 164. Inverse vertex portions 162 are formed in boundaries between the convex portions of the resin layer 164.

The liquid crystal lens film structure of the third embodiment is structurally opposite to that of the first embodiment with the exception of a position of the adhesive layer and a space filled with the liquid crystal molecules. As such, the description of the third embodiment regarding the same structure and effects thereby is omitted. The inverse vertex portion 162 of the third embodiment can cause crosstalk, like the vertex portion 162 of the first embodiment.

Each of the convex portions can be formed in a quadratic function shape. In this case, the adhesive layer 268 can come in contact with a part of the convex portion corresponding to a vertex of the quadratic function shape.

Figure 14:
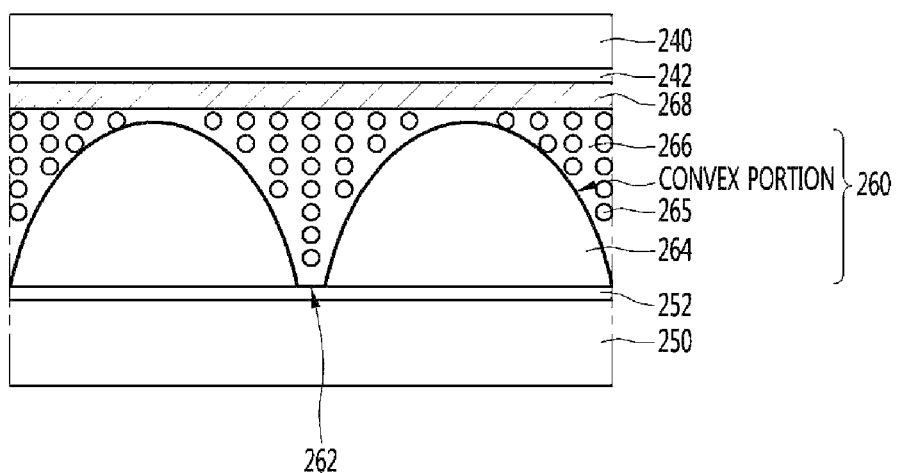
FIG. 14 is a cross-sectional view schematically showing a liquid crystal lens film structure according to a fourth embodiment of the present invention.

FIG. 14 is a cross-sectional view schematically showing a liquid crystal lens film structure according to a fourth embodiment of the present disclosure. Referring to FIG. 14, the liquid crystal molecules 265 included in the liquid crystal lens film structure 230 are filled in between convex portions of a resin layer 264. Bottom portions 262 are formed between the convex portions of the resin layer 264.

The liquid crystal lens film structure of the third embodiment is structurally opposite to that of the first embodiment with the exception of a position of the adhesive layer and a space filled with the liquid crystal molecules. As such, the description of the third embodiment regarding the same structure and effects thereby is omitted or will be brief. The bottom portion 262 disposed between the convex portions adjacent to each other can increase the distance between the adjacent convex portions. In accordance therewith, the generation of crosstalk due to the inverse vertex portions 162 of the third embodiment can be prevented.

Image Display Device

The image display device 110 includes a display panel 120 configured to display an image, and a liquid crystal lens film structure 130 (shown in FIG. 6A or 12A).

The display panel 120 includes a plurality of left eye pixels PL and a plurality of right eye pixels PR. In a 2-D mode, the plurality of left eye pixels PL and the plurality of right eye pixels PR are used to display a single frame image. In a 3-D mode, the plurality of left eye pixels PL is used to display a left eye image and the plurality of right eye pixels PR is used to display a right eye image.

Also, the display panel 120 is used to generate an image corresponding to an image signal. Any well-known display panel can be used as the display panel 120 without any limitation. In other words, the display panel 120 is not limited to kinds of the display panels without departing the spirit (or object) of the present disclosure. For example, the display panel 120 can be one of liquid crystal display panels, organic light emitting diode display panels and a plasma display panel. The liquid crystal display panels and the organic light emitting diode display panels, which are well-known in the art of the present disclosure and have a variety of configurations, can be selectively used as the display panel 120 without any limitation.

Such a display panel 120 included in the image display device 110 according to an embodiment of the present disclosure can be a liquid crystal display panel which includes a first substrate, a second substrate and a liquid crystal layer interposed between the first and second substrates. In this case, thin film transistors can be formed on the first substrate and color filter layer can be formed on the second substrate. The thin film transistors are used to switch voltages being applied to respective pixels. The color filter layer includes R (red), G (green) and B (blue) color filters which are arranged alternately with one another and opposite to the pixels. Alternatively, the display panel 120 can be a liquid crystal display panel of a COT (color-filter on transistor) structure which allows the thin film transistors and the color filter layer to be formed on the first substrate.

Also, at least one alignment film can be interposed between the first substrate and the liquid crystal layer and/or between the second substrate and the liquid crystal layer. The alignment film is used to align liquid crystal molecules of the liquid crystal layer.

The liquid crystal display panels can be classified into various modes, such as a TN (twisted nematic) mode, a VA (vertical alignment) mode, an IPS (In-plane switching) mode, an FFS (fringe field switching) mode and so on. Such mode liquid crystal display panels can be selectively used as the display panel 120.

When the liquid crystal display panel is used as the display panel 120, a backlight unit can be disposed under the liquid crystal display panel. The backlight unit is used to apply light to the liquid crystal display panel.

Alternatively, the display panel 120 included in the image display device according to an embodiment of the present disclosure can be an organic light emitting diode display panel which includes a first substrate and organic light emitting elements arranged on the first substrate. The organic light emitting element includes a first electrode, a second electrode and an organic emission layer interposed between the first and second electrodes. In this case, thin film transistors for applying voltages to the respective organic light emitting elements can be formed on the first substrate. A sealing layer and/or a sealing substrate are disposed on the organic light emitting elements. The sealing layer and the sealing substrate are used to protect the organic light emitting elements.

A 2-D image generated in the above-mentioned display panel 120 can be selectively converted into a 3-D image by the liquid crystal lens film structure 110 according whether or not a voltage is applied to the liquid crystal lens film structure 110.

If the image display device 110 is driven in a 2-D mode, the display panel 120 displays a single image. In this case, first and second voltages having the same value (or level) are the first and second electrode layers 142 and 152 of the liquid crystal lens film structure 120. Then, any electric field is not generated between the first and second electrodes 142 and 152. As such, the liquid crystal lens film structure 120 transmits the single image on the display panel 120 as it is, like a normal glass plate. In accordance therewith, a 2-D image can be viewed to users.

When the image display device 110 is driven in a 3-D mode, the display panel 120 displays a left eye image and a right eye image. The first and second voltages having different values (or levels) from each other are applied to the first and second electrode layers 142 and 152 of the liquid crystal lens film structure 130. Then, an electric field is generated between the first and second electrode layers 142 and 152. As such, the liquid crystal lens film structure 130 is driven as a lens. The driven liquid crystal lens film structure 130 divides the images on the display panel 120 into the left and right eye images and transfers the divided left and right eye images to different viewing zones from each other. Therefore, a 3-D image can be viewed to users.

First Experiment

In order to check an adhesive property and process stability of a liquid crystal lens film structure of the present disclosure, a first dynamic shear force measurement procedure had been performed for a liquid crystal lens film structure of the present disclosure.

Figure 15:
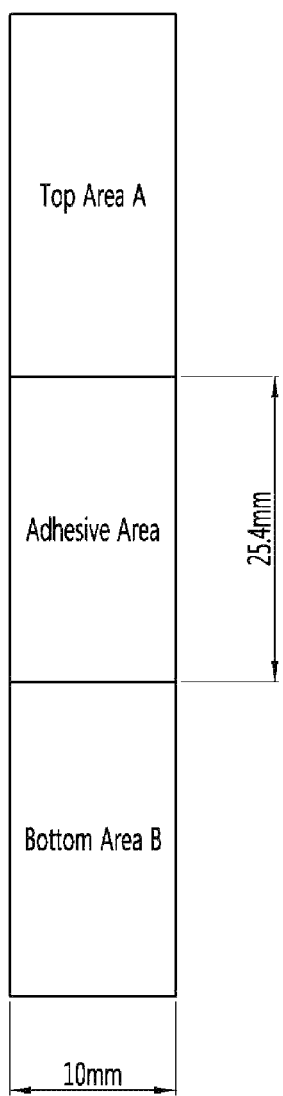
FIG. 15 is a planar view showing a sample which is used to measure the dynamic shear force of the liquid crystal lens film structure according to an example of the present invention.
Figure 16:
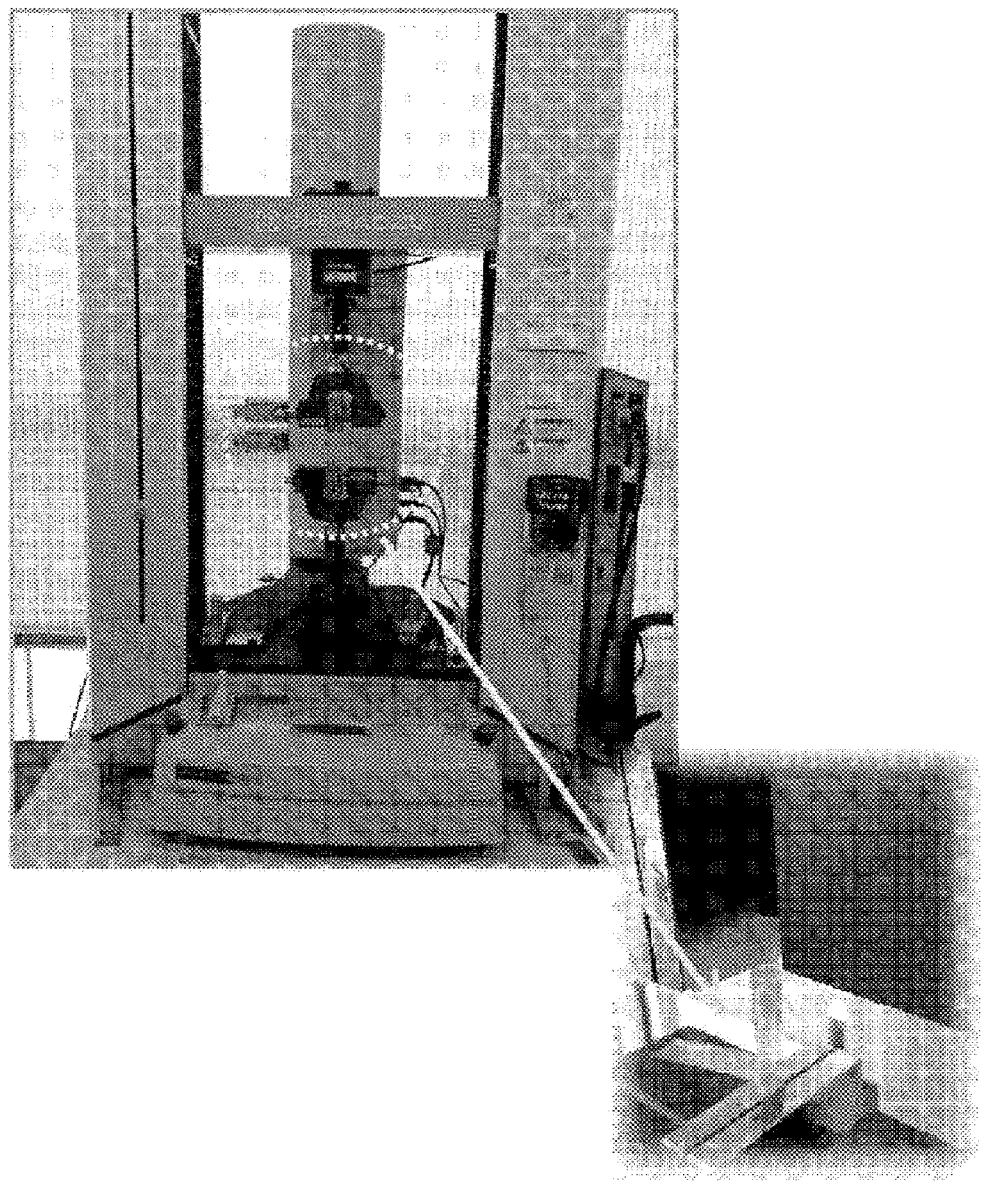
FIG. 16 is a photograph showing a dynamic shear force measurement instrument according to an example of the present invention.

FIG. 15 is a planar view showing a sample which is used to measure the dynamic shear force of the liquid crystal lens film structure of the present disclosure. FIG. 16 is a photograph showing a dynamic shear force measurement instrument.

As shown in FIG. 15, the sample includes a first substrate and a liquid crystal layer which are disposed in a top area A and a liquid crystal lens film and a second substrate which are disposed a bottom area B. The dynamic shear force of the liquid crystal lens film structure according to a first embodiment of the present disclosure had been measured three times using the dynamic shear force measurement instrument of FIG. 16 which is fabricated in a model name of AG-X by Shimadzu Co. Ltd. The measured resultants are represented as the following table 1. The liquid crystal lens film structure of the first embodiment includes an adhesive layer not having internally any adhesive material and any conductive material.

TABLE 1

|  | Items | | | |
| --- | --- | --- | --- | --- |
|  | 1st | 2nd | 3rd | Average |
| Dynamic shear force (kgf/in$^2$) | 26.06 | 24.94 | 25.22 | 25.41 |

As seen from table 1, it is confirmed that the liquid crystal lens film structure of the present disclosure has an average dynamic shear force of about 25.41 kgf/in2.

Second Experiment

A second dynamic shear force measurement procedure had been performed for liquid crystal lens film structures of the present disclosure and a first comparative example. The liquid crystal lens film structure of the present disclosure includes an adhesive layer having internally any adhesive material and any conductive material. The liquid crystal lens film structure of the first comparative example includes upper and lower glass substrates without any liquid crystal lens film. The second dynamic shear force measurement process is the same as the first dynamic shear force measurement procedure in measurement method and instrument. The measured resultants are represented as the following table 2.

TABLE 2

|  | Dynamic shear force (kgf/in$^2$) | |
| --- | --- | --- |
| Items | Present disclosure | First comparative example |
| 1st | 27.01 | 3.1 |
| 2nd | 25.5 | 2.8 |
| 3rd | 26.3 | 4.1 |
| Average | 26.27 | 3.3 |

Referring to table 1, it is represented that the liquid crystal lens film structure of the present disclosure has the average dynamic shear force of about 26.27 kgf/in2 and the liquid crystal lens film structure of the first comparative example has the average dynamic shear force of about 3.3 kgf/in2. Therefore, it is evident that the liquid crystal lens film structure of the present disclosure has a superior adhesive property.

Third Experiment

A driving voltage of the liquid crystal lens film structure of the present disclosure had been measured by gradually increasing a voltage between electrode layers of the liquid crystal lens film structure until full white is displayed. The liquid crystal lens film structure of the present disclosure includes an adhesive layer having internally an adhesive material and a conductive material. A driving voltage of a liquid crystal lens film structure of a second comparative example had been measured by gradually increasing a voltage between electrode layers of the liquid crystal lens film structure of the second comparative example until full white is displayed. The liquid crystal lens film structure of the second comparative example is the related art liquid crystal lens array with the structure shown in FIG. 1. The measured resultants are represented as the following table 3.

TABLE 3

| Items | Present disclosure | Second comparative example |
| --- | --- | --- |
| Driving voltage (V) | 10 | 17 |

As seen from table 3, it is evident that the liquid crystal lens film structure of the present disclosure has a lower driving voltage compared to the liquid crystal lens array of the related art.

Also, although the present disclosure has been limitedly explained regarding the embodiments described above, it should be understood by the ordinary skilled person in the art that the present disclosure is not limited to these embodiments, but rather that various changes or modifications thereof are possible without departing from the spirit of the present disclosure. More particularly, various variations and modifications are possible in the component parts which are described in the embodiments. Accordingly, the scope of the present disclosure shall be determined only by the appended claims and their equivalents without being limited to the detailed description.

What is claimed is:

1. A liquid crystal lens film structure comprising: a first substrate; a second substrate opposite to the first substrate; an adhesive layer on the second substrate; and a liquid crystal lens film between the first substrate and the adhesive layer, wherein the liquid crystal lens film includes a resin layer configured to include a plurality of concave portions and a plurality of liquid crystal portions configured to each include liquid crystal molecules filled in the respective concave portion, and wherein the adhesive layer is in contact with the liquid crystal lens film and includes a conductive material, wherein the adhesive layer includes adhesive capsules, wherein the adhesive capsules include a shell formed from the conductive material.

2. The liquid crystal lens film structure of claim 1, wherein boundaries between the concave portions are in contact with the adhesive layer.

3. The liquid crystal lens film structure of claim 1, wherein the adhesive capsules are scattered within the adhesive layer and each formed in one of a single layer structure and a core-shell structure.

4. The liquid crystal lens film structure of claim 1, further comprising at least one electrode interposed at least one of between the second substrate and the adhesive layer and between the first substrate and the liquid crystal lens film.

5. An image display device comprising:
the liquid crystal lens film structure of claim 1; and
a display panel under the liquid crystal lens film structure.

6. A liquid crystal lens film structure comprising: a first substrate; a second substrate opposite to the first substrate; an adhesive layer on a surface of the first substrate opposite to the second substrate; and a liquid crystal lens film between the adhesive layer and the second substrate, wherein the liquid crystal lens film includes a resin layer configured to include a plurality of convex portions and a plurality of liquid crystal portions configured to each include liquid crystal molecules filled in between the concave portions, and wherein the adhesive layer is in contact with the liquid crystal lens film and includes a conductive material, wherein the adhesive layer includes adhesive capsules, wherein the adhesive capsules include a shell composed of a conductive material.

7. The liquid crystal lens film structure of claim 6, wherein the convex portion is a quadratic function shape and wherein the adhesive layer is in contact with a vertex of the convex portion.

8. The liquid crystal lens film structure of claim 6, wherein the adhesive capsules are dispersed within the adhesive layer and each composed of a single layer structure or a core-shell structure.

9. The liquid crystal lens film structure of claim 6, further comprising at least one electrode interposed at least one of between the first substrate and the adhesive layer and between the second substrate and the liquid crystal lens film.

10. An image display device comprising:
the liquid crystal lens film structure of claim 6; and
a display panel under the liquid crystal lens film structure.

11. A method of fabricating a liquid crystal lens film structure, the method comprising:
forming electrode layers on a first substrate and a second substrate;
forming a resin layer, which includes one of pluralities of concave portions and convex portions, on one of the first substrate and the second substrate;
rubbing a surface of the resin layer in a fixed direction;
forming an adhesive layer on one of the first substrate and the second substrate;
forming liquid crystal portions by filling liquid crystal molecules into the concave portions or in between the convex portions; and
combining the first and second substrates with each other.

12. The method of claim 11, wherein the formation of the adhesive layer further includes rubbing a surface of the adhesive layer using a rubbing roller.

13. The method of claim 11, wherein a rubbing direction of the resin layer and a rubbing direction of the adhesive layer are the same or orthogonal.

14. The method of claim 11, wherein the adhesive layer is formed from at least one selected a material group which includes an epoxy-based compound, an acrylic-based compound, a phenoxy-based compound and a thiol compound.

15. The method of claim 12, wherein the adhesive layer is formed to further include at least one of a transparent conductive material and silica.

* * * * *